United States Patent [19]

Nishikawa et al.

[11] Patent Number: 4,516,671
[45] Date of Patent: May 14, 1985

[54] CONTROL APPARATUS FOR A TORQUE CONVERTOR CLUTCH

[75] Inventors: Masao Nishikawa, Tokyo; Takashi Aoki, Wako; Shinzo Sakai; Hiroshi Yoshizawa, both of Kamifukuoka, all of Japan

[73] Assignee: Honda Giken Kogyo Kabushiki Kaisha, Tokyo, Japan

[21] Appl. No.: 383,610

[22] Filed: Jun. 1, 1982

[30] Foreign Application Priority Data

Jun. 1, 1981 [JP] Japan .................................. 56-82520

[51] Int. Cl.³ .............................................. B60K 41/02
[52] U.S. Cl. .................. 192/.076; 192/3.31; 192/3.58
[58] Field of Search ............... 192/0.075, 0.092, 0.034, 192/0.07, 0.03 R, 3.57, 0.033, 3.58, 3.29, 3.3, 3.31, 0.052, 0.076, 0.032; 74/867, 732, 731, 865, 870, 866

[56] References Cited

U.S. PATENT DOCUMENTS

| 3,810,531 | 5/1974 | Edmunds | 192/3.31 |
| 4,253,553 | 3/1981 | Yamada et al. | 192/.076 |
| 4,298,105 | 11/1981 | Duhaime | 192/3.31 |

FOREIGN PATENT DOCUMENTS 8001098  5/1980  Japan .................................. 192/3.31

Primary Examiner—George H. Krizmanich
Attorney, Agent, or Firm—Armstrong, Nikaido, Marmelstein & Kubovcik

[57] ABSTRACT

A control apparatus for a torque convertor clutch in a transmission including a circuit for engaging the clutch to mechanically interconnect a pump to a turbine of the torque convertor and a mechanism for disabling the circuit when the engine output increases above a predetermined set output value thereby releasing the clutch from engagement. A release preventing mechanism operatively associated with the release mechanism is provided to prevent operation of the release mechanism when the vehicle speed increases above a predetermined set speed value even though the engine output increases above the predetermined set output value.

6 Claims, 8 Drawing Figures

CONTROL APPARATUS FOR A TORQUE CONVERTOR CLUTCH

BACKGROUND OF THE INVENTION

This invention relates to an apparatus for controlling operation of a clutch for a torque convertor in a transmission for a vehicle interconnecting an internal combustion engine and a driving wheel of the vehicle.

A torque convertor provided in a transmission for a vehicle as an automatic transmission or the like can have a clutch for mechanically transmitting torque from a pump side of the convertor to a turbine side thereof. It has been usual with this conventional apparatus that, in order to decrease slip loss at the torque convertor in the case of cruising of the vehicle at a high speed and thus improve fuel consumption, the clutch is arranged so that the engagement thereof is controlled in conjunction with a shift-up operation of the transmission to a higher speed stage. With this arrangement, during the driving at a high speed stage, the pump side and the turbine side are directly mechanically interconnected, so that there is no slip caused by fluid torque transmission. However, there has been a disadvantage that the torque amplification function which is the fundamental function of the torque convertor cannot be obtained. Consequently, acceleration and ascent ability of the vehicle at the high speed stage becomes poor.

OBJECTS AND SUMMARY OF THE INVENTION

It is an object of the present invention to provide a control apparatus for a torque convertor clutch wherein the torque amplification function of the torque convertor can be obtained to improve vehicle acceleration and ascent ability.

It is another object of the present invention to provide a control apparatus which permits favorable fuel consumption.

It is a further object of the present invention to provide a control apparatus for a torque convertor clutch that improves the operation of a transmission having the torque convertor therein.

These and other objects are attained in a control apparatus for a torque convertor clutch in a transmission. The transmission is in a vehicle between an engine and a driving wheel of the vehicle. The transmission includes a torque convertor having a pump, a turbine, and a clutch for mechanically interconnecting the pump to the turbine. The control apparatus comprises means for engaging the clutch and release means for disabling the means for engaging when the engine output increases above a predetermined set output value thereby releasing the clutch.

The control apparatus can further comprise a release-preventing means operatively associated with the release means for preventing operation of the release means when the vehicle speed increases above a predetermined set speed value even though the engine output increases above the predetermined set output value.

The control apparatus can further comprise a low-speed disengaging means for keeping the clutch disengaged whenever the vehicle speed is below a certain low speed.

The control apparatus can still further comprise idle disengaging means for keeping the release means inoperative whenever the engine output is below a predetermined low output.

The control apparatus can still further comprise a first speed disengaging means for keeping the torque convertor clutch disengaged whenever a first speed clutch is engaged.

Certain specific structures of each of the above means are disclosed.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1:
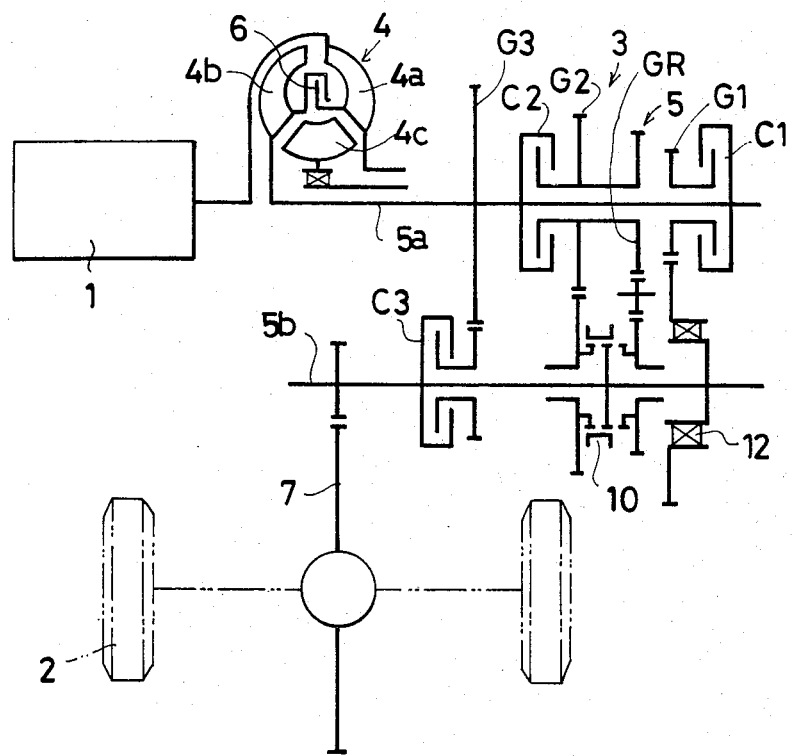
FIG. 1 is a diagrammatic view of a transmission for a vehicle having the present invention therein.

Referring to FIG. 1, an internal combustion engine 1 is connected to a driving wheel 2 of a vehicle through a transmission 3. The transmission 3 comprises a torque convertor 4 and a sub-transmission 5 having plural gear trains of different change speed ratios.

The torque convertor 4 is provided with a pump 4a connected directly to the engine 1, a turbine 4b arranged to be driven by circulation of the internal fluid caused by the pump 4a, and an intermediate stator 4c. The torque convertor 4 is additionally provided with a torque convertor clutch 6 for mechanically transmitting torque from the pump 4a side to the turbine 4b side.

Various types clutches 6 have been hitherto proposed. For instance, an oil pressure operated friction clutch is disclosed in Japanese Patent Publication Sho No. 55-32944. An oil pressure operated type one-way clutch is disclosed in Japanese Patent Application Sho No. 55-157263.

Figure 2:
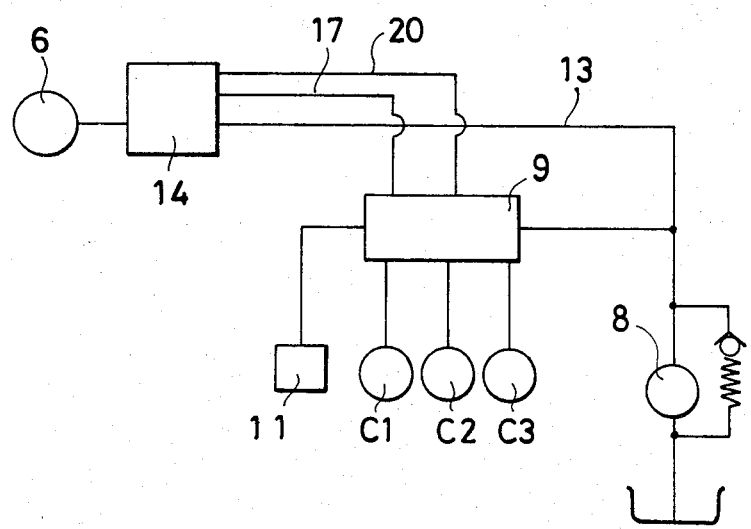
FIG. 2 is a block diagram showing the circuit position of the present invention in a transmission.

The sub-transmission 5 has a change speed function of three forward stages and one backward stage. It is provided, between an input shaft 5a connected to the turbine 4b and an output shaft 5b connected through a differential gear 7 to the driving wheels 2. It includes gear trains G1, G2, G3 for forward first to third speeds and one reverse gear train GR, and respective oil pressure operated clutches C1, C2, C3 for the first to third speeds are interposed in the respective forward gear trains G1, G2, G3. These oil pressure operated clutches C1, C2, C3 may be selectively supplied with pressure oil from an oil pressure source 8 through a change speed control means 9 as shown in FIG. 2. In this manner, with the degree of a change of the relations between vehicle speed and a degree of throttle opening, there can be obtained firstly a first speed driving by an establishment of the first speed gear train G1 caused by an oil supply to the first speed oil pressure operated clutch C1 in a region I in FIG. 4, a second speed driving by an establishment of the second speed gear train G2 caused by an oil supply to the second speed oil pressure operated clutch C2 in a region II bordered by a line A, and a third speed driving by an establishment of the third speed gear train G3 caused by an oil supply to the third speed oil pressure operated clutch C3 in a region III bordered by a line B.

In the illustrated example, the reverse gear line GR uses the second speed oil pressure operated clutch C2 in common with the second speed gear train G2, and is arranged to be established by a changeover operation of a selector gear 10 for selecting either of the two gear trains Gr, G2, towards the reverse driving side shown on the right-handed side in FIG. 1. The selector gear 10 is arranged to be controlled in changing over by a control member 11 such as a servo valve or the like arranged to be operated in conjunction with the change speed control means 9.

At the time of speed changing from the first speed to the second speed, the two oil pressure operated clutches C1, C2 for the first speed and the second speed are both supplied with oil, and a smooth change speed operation can be carried out by operation of a one-way clutch 12 interposed in the first speed gear train G1.

The above arrangement is not especially different from that in the conventional known apparatus, and accordingly further explanation thereof is now omitted. The controls over the torque convertor clutch 6 which is the gist of the present invention will now be explained as follows:

The clutch 6 is arranged to be controlled in operation by a control portion 14 interposed in an oil supply passage 13 for supplying a pressure oil thereto. According to this invention, the control portion 14 is provided with a release means 15 which is so operated due to an increase of an engine output to above a predetermined set value as to release the engagement of the clutch 6.

Figure 3:
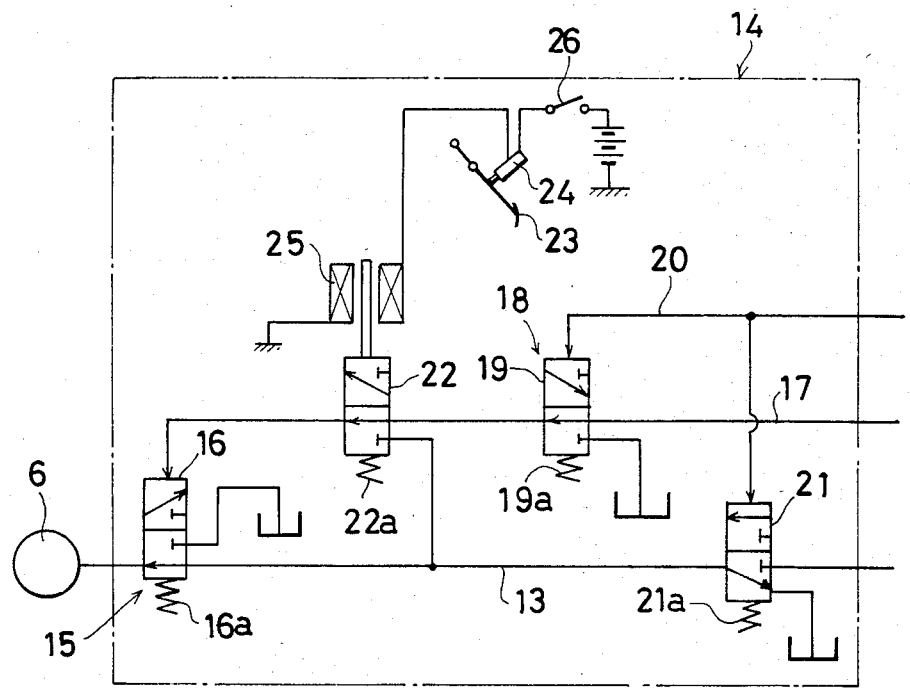
FIG. 3 is a circuit diagram of a first embodiment of the present invention.

Referring to FIG. 3 showing a concrete example thereof, the release means 15 comprises a first control valve 16 interposed in the oil supply passage 13. The valve 16 is urged towards its closing side, for instance, through a first control line 17 by throttle pressure as an engine output signal, in proportion to the degree of throttle opening supplied from a known throttle valve provided in the change speed control means 9. In this manner, if the engine output, that is, the degree of throttle opening is increased to a value more than a predetermined set value shown by a line C in FIG. 4, the valve 16 is closed against the action of a spring 16a and thereby the oil supply to the torque convertor clutch 6 is cut off and the engagement thereof is released. The height of the line C is to be set in accordance with the kind of the vehicle. It is desirable that it be set at a comparatively low level, for instance, in the case of a vehicle having a comparatively low output engine mounted thereon.

Figure 4:
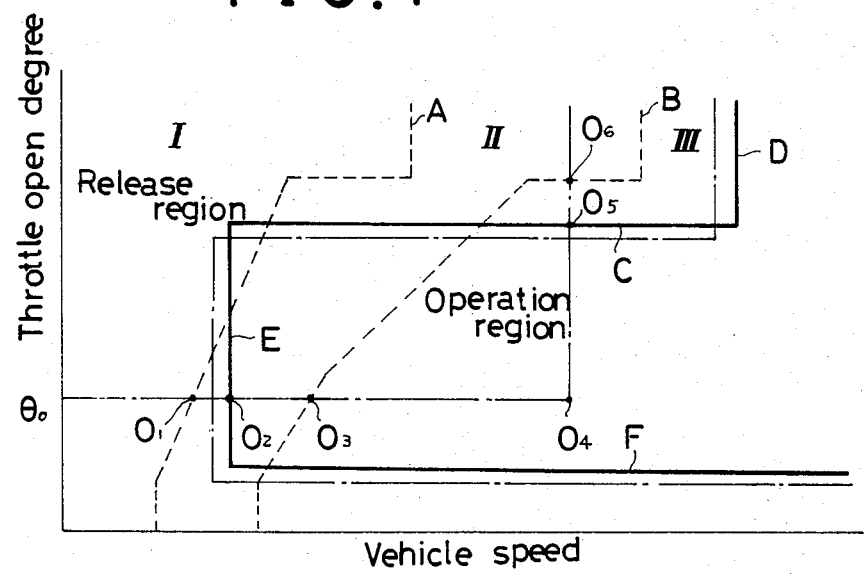
FIG. 4 is a graphical presentation of the operational characteristics of the first embodiment.

Additionally, in the illustrated example, there is provided a release-preventing means 18 which is so operated due to an increase of a vehicle speed to above a predetermined set value as shown by line D in FIG. 4, as to prevent the operation of the release means 15, so that the torque convertor clutch 6 can be brought to its engaged condition in a region on the right side of the line D.

More in detail, the release-preventing means 18 comprises a second control valve 19 interposed in the first control line 17. The valve 19 is urged towards its closing side, for instance, through a second control line 20 by pressure from a governor, as a vehicle speed signal, in proportion to a vehicle speed supplied from a known governor valve provided in the change speed control means 9. In this manner, when the vehicle speed is increased to go beyond the line D, the valve 19 is closed against the action of a spring 19a, and thereby the action of the throttle pressure on the first control valve 16 serving as the release means 15 is cut off, and consequently the valve 16 is opened by the spring 16a. The oil supply to the clutch 6 is resumed and the clutch 6 is returned to be brought into its engaged condition. The line D may be set to be on a lower speed side when the engine output has an excessive power which is large enough in relation to the weight of the vehicle body.

Additionally, in the illustrated example, in order that a smooth start acceleration property may be obtained by releasing the torque convertor clutch 6 when the vehicle speed is below a predetermined low speed shown by a line E in FIG. 4, a low speed disengagement means can be provided comprising a third control valve 21 of the normally closed type urged towards its closing side by a spring 21a interposed in the oil supply passage 13 so that the oil supply to the clutch 6 may be kept in an unengaged condition until the valve 21 is opened against the action of the spring 21a by the governor pressure supplied from the second control line 20 and acting thereon towards its opening side. It is not always necessary that the slope of line E be vertical and may be set to be any of various inclined lines or curved lines.

Additionally, in the illustrated example, there is provided an idle disengaging means comprising fourth control valve 22 which causes the oil pressure of the oil supply passage 13 to act on the first control valve 16 so as to close the same against the action of the spring 16a in a region below a line F, so that when the degree of throttle opening is below a predetermined low degree shown by the line F in FIG. 4, the torque convertor clutch 6 is released. This results in a saving of the amount of fuel consumption, the absorption of the torque change at the time of an engine brake operation and, an avoidance of engine stall at the time of a rapid braking on a slippery road. More in detail, the fourth control valve 22 is interposed in the first control line 17 and is ordinarily brought in its inoperative position by the action of a spring 22a so as to cause the throttle pressure to act on the first control valve 16. But in the region which is below the line F wherein an acceleration pedal 23 is at an idle position, for instance, a detecting switch 24 for determining the position of the pedal 23 is closed to energize a solenoid 25 and thereby the valve 22 is changed over to its operative position at which the oil pressure of the oil supply passage 13 is present on the first control valve 16.

If the strength of the solenoid 25 is strong enough, it may be so arranged that the fourth control valve 22 is omitted and the first control valve 16 is opened directly by the solenoid 25. A switch 26 is arranged to move with an engine ignition switch.

It is preferred that the foregoing first to fourth control valves 16, 19, 21, 22 are snap-action type valves accompanying a hysteresis phenomenon on opening and closing operations thereof, so that the control characteristics for the clutch 6 are applied with a hysteresis as shown by a dot-dash-line in FIG. 4.

Next, the operation of the above example apparatus will be explained as follows:

When considering such an occasion that a vehicle is started under the condition that the acceleration pedal is lightly pushed down and a degree of throttle opening is $\theta°$, firstly an increase in speed at the first speed stage is made. When the vehicle speed crosses the line A at a point $0_1$, by the acceleration, a shifting up to the second speed stage is effected. Thereafter, when the vehicle speed crosses the line E at a point $0_2$, the torque convertor clutch 6 is engaged and thereafter when the vehicle speed crosses the line B at a point $0_3$ a shifting-up to the third speed stage is effected. Constant speed cruising is obtained at a point $0_4$ at which the road surface resistance and an engine output are balanced.

If, thereafter, when the vehicle approaches a sloping road, the acceleration pedal is further pushed down to increase the degree of throttle opening so as to keep the constant speed cruising of the vehicle and the degree of throttle opening crosses the line C at a point $0_5$, then the clutch 6 for the torque convertor is released, so that a torque amplification function by the torque convertor 4 is effected. If, as the slope becomes steeper, the degree of throttle opening reaches a point $0_6$ at which it goes beyond the line B, a shift-down to the second speed is effected.

In the case of such an acceleration that the vehicle is started under the condition that the degree of throttle opening is made above the line C by strongly pushing down the acceleration pedal, the shifting up of first speed → second speed → third speed is effected while the clutch 6 is kept in a released or disengaged condition. If the vehicle speed becomes such a high speed driving condition that is above the line D, then the clutch 6 is engaged and thereby prevents any slipping at the torque convertor 4. There can be obtained a silent high speed cruising hardly producing engine noise with a lower amount of fuel consumption.

In the foregoing example, the torque convertor clutch 6 is arranged to be operated at a comparatively low vehicle speed shown by the line E, so that there can be expected a lowering of noise and a favorable fuel saving. Additionally, an engaged region and a release region of the clutch are provided in each of the respective regions I, II, III for the first to third speeds so that the engine output may be transmitted to the driving wheels while being controlled in the 6 ways as above. Consequently, there can be obtained a performance similar to a six-stage change speed mechanism in spite of the fact that the apparatus is composed of the three-stage change speed mechanism. There can be brought about such an advantage by this example that, as against the case of the conventional six-stage transmission in which shift shocks are caused five times in the course of the shifting from the lowest stage to the highest speed stage, shift shocks caused in the case of this example only occur three times at the points $0_1$, $0_2$, $0_3$ where the vehicle is started, for instance, at the throttle open degree of $\theta°$.

Figure 5:
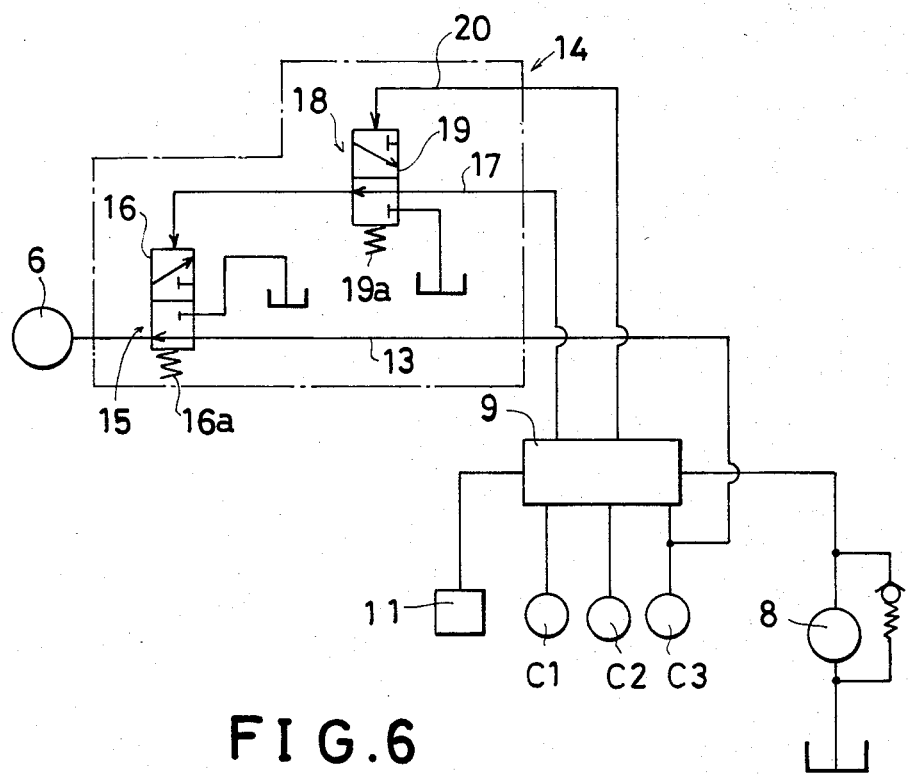
FIG. 5 is a circuit diagram of a second embodiment of the present invention.

FIG. 5 shows a second embodiment of this invention. In this example, the oil supply passage 13 connected to the clutch 6 is supplied with oil pressure utilized for operating the third speed oil pressure operated clutch $C_3$ so that the clutch 6 may be operated only at the time of third speed driving.

Figure 6:
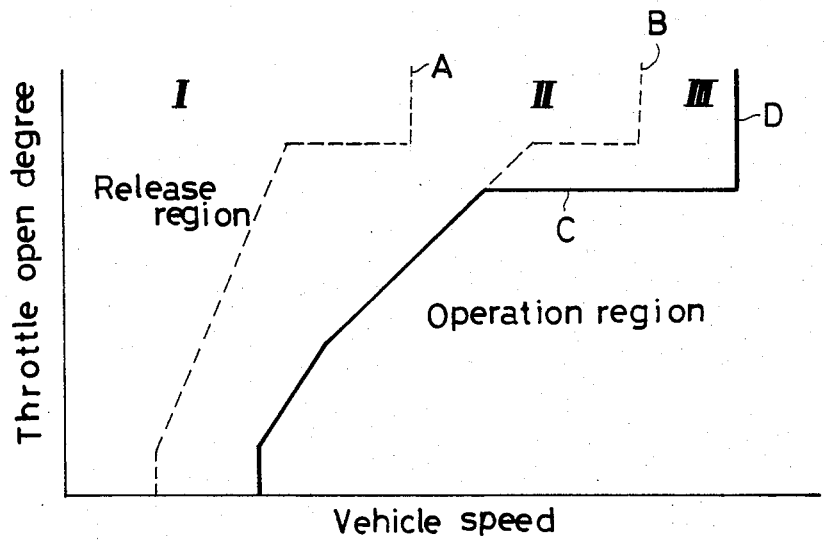
FIG. 6 is a graphical presentation of the operational characteristics of the second embodiment.

The release means 15 and the release-preventing means 18 are not different in construction from those in the foregoing example, and the operation characteristics thereof are as shown in FIG. 6.

This example is effective for a vehicle such as a small-sized motorcar wherein the engine output is small and the torque amplification function of the torque convertor 4 is required also for the second speed driving.

Figure 7:
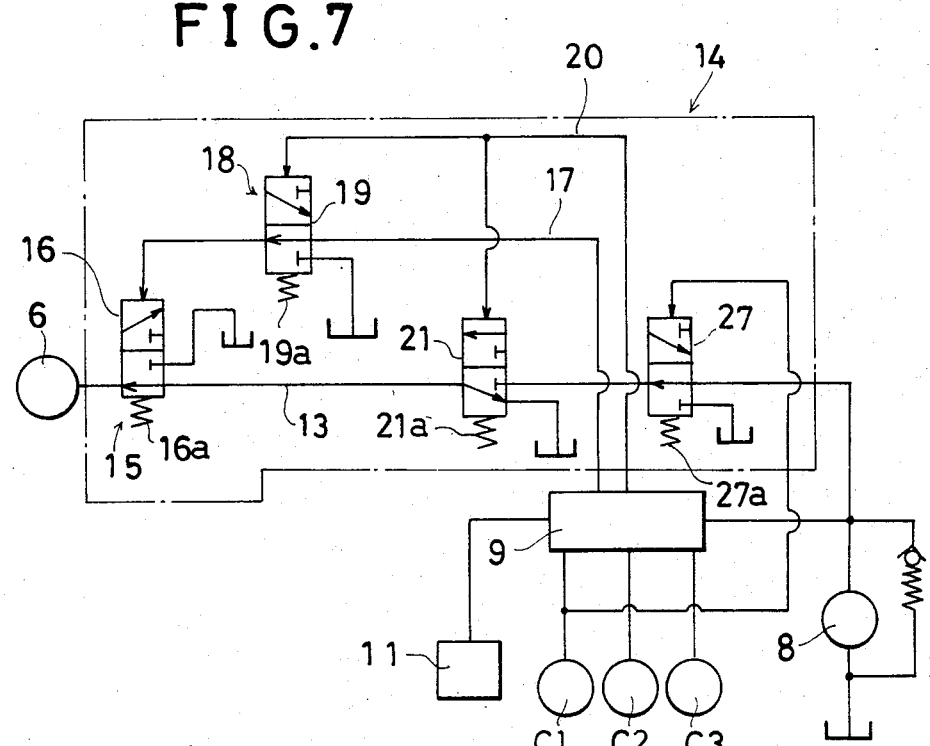
FIG. 7 is a circuit diagram of a third embodiment of the present invention.

FIG. 7 shows a third embodiment thereof. The foregoing example in FIG. 3 is so modified that a fifth control valve 27 is interposed in the oil supply passage 13, and is arranged to be closed against the action of a spring 27a by oil pressure utilized for the first speed oil pressure operated clutch $C_1$, so that the engagement of the clutch 6 does not occur at the time of the first speed driving. The operation characteristics thereof are shown in FIG. 8.

In the example of FIG. 7, the fourth control valve 22 in the foregoing first embodiment is omitted.

Figure 8:
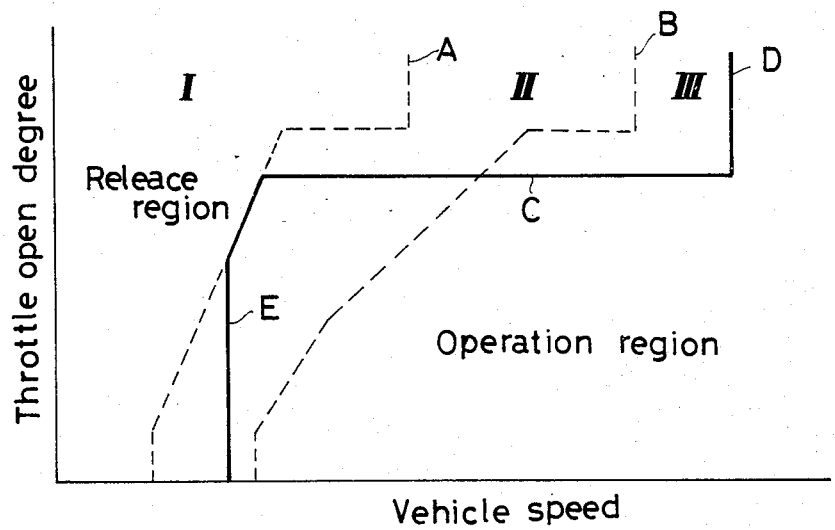
FIG. 8 is a graphical presentation of the operational characteristics of the third embodiment.

If, in FIG. 8, it is desired that line E coincide with the line A, either the third control valve 21 can be omitted or kept in an open condition, whereby the clutch 6 is always engaged in the case of a low load of second speed.

The above has been explained with reference to the apparatus provided with the sub-transmission 5 having an automatic change speed function comprising three forward stages, but this invention is not limited thereto and can be applied also to an apparatus of semi-automatic or any others having further multi-stage change speed functions.

In the foregoing examples, the throttle pressure and the governor pressure obtained from the throttle valve and the governor valve provided in the change speed control means 9 are used as the engine output signal and the vehicle speed signal, respectively, but it can be also considered that those signals are taken as electric signals and the foregoing control operations are effected by means of solenoid valves or the like. Furthermore, the engine output may be changed into a signal by using as a parameter an engine intake negative pressure or the like instead of the degree of throttle opening.

Thus, according to this invention, a torque convertor clutch is released from its engagement due to an increase of an engine output to a value more than a predetermined set value by a release means, so that at the time of acceleration or ascent driving of a vehicle, even in the case of the vehicle's cruising at a high speed stage, the clutch is immediately released due to an increase of the engine output to a value above a predetermined set value. Thereby the torque amplification function of the torque convertor can be obtained to improve the acceleration and the ascent ability of the vehicle. According to the second feature of this invention, there is provided a release-preventing means which operates at the time of a predetermined high speed driving so as to prevent the operation of the release means, so that a favorable fuel consumption saving and a lowering of noise can be obtained by the engagement of the clutch at the time of the vehicle's cruising at a high speed with the engine being within a high output region.

It is readily apparent that the above-described control apparatus for a torque convertor clutch meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A control apparatus for a torque convertor clutch in a transmission, in a vehicle between an engine producing an output and a driving wheel, the transmission including a torque convertor having a pump, a turbine, and a clutch for mechanically interconnecting the pump to the turbine, said control apparatus comprising:

means for engaging the clutch, release means for disabling the means for engaging when the engine output increases above a predetermined set output value thereby releasing the clutch, and a release-preventing means operatively associated with said release means for preventing operation of said release means when the vehicle speed increases above a predetermined set speed value even though the engine output increases above the predetermined set output value;

said transmission further including engine output signal means for producing an output signal proportionate to engine the output, an oil pressure source, and vehicle speed signal means for producing a speed signal proportionate to vehicle speed; said means for engaging including an oil supply passage from said oil pressure source to said clutch, said clutch being engaged by oil pressure from said oil pressure source; said release means comprising a first control valve interposed in said oil supply passage having an open position in which oil pressure is supplied to said clutch and a closed position in which oil pressure is cut off from being supplied to said clutch, a first spring urging said first control valve towards said open position, and a first control line applying said output signal from said engine output signal means urging said first control valve towards said closed position, said first spring having sufficient spring force to hold said first control valve in said open position until said output signal from said engine output signal means reaches said predetermined set output value.

2. The control apparatus of claim 1, wherein said release-preventing means comprises a second control valve interposed in said first control line between said first control valve and said engine output signal means having an open position in which said output signal is conducted to said first control valve and a closed position in which said output signal is blocked, a second spring urging said second control valve towards said open position, and a second control line applying said speed signal from said vehicle speed signal means urging said second control valve towards said closed position, said second spring having sufficient spring force to hold said second control valve in said open position until said speed signal from said vehicle speed signal means reaches said predetermined set speed value.

3. The control apparatus of claim 2, further comprising low speed disengaging means for keeping the clutch disengaged whenever the vehicle speed is below a certain low speed.

4. The control apparatus of claim 3, wherein said low speed disengaging means comprises a third control valve interposed in said oil supply passage between said oil pressure source and said first control valve having an open position in which oil pressure is supplied to said first control valve and a closed position in which oil pressure is cut off from being supplied to said first control valve, a third spring urging said third control valve towards said closed position, and a connection to said second control line applying said speed signal from said vehicle speed signal means urging said third control valve towards said open position, said third spring having sufficient spring force to hold said third control valve in said closed position until said speed signal from said vehicle speed signal means reaches said certain low speed.

5. The control apparatus of claim 4, further comprising idle disengaging means for keeping said first control valve in said closed position whenever the engine output is below a predetermined low output.

6. The control apparatus of claim 5, wherein said vehicle includes an acceleration pedal operatively coupled to said engine to control engine output and moveable from an idle position and said idle disengaging means comprises a fourth control valve interposed in said first control line between said second control valve and said first control valve having an open position in which said output signal is conducted to said first control valve and a closed position in which said output signal is blocked, a fourth spring urging said fourth control valve towards said open position, means for sensing when said acceleration pedal is in said idle position and then producing an idle signal, and means connected to said means for sensing for urging said fourth control valve towards said closed position whenever said idle signal is received.

* * * * *